June 29, 1954     L. DINE ET AL     2,682,603
PORTABLE PHOTOGRAPHIC LIGHT UNIT
Filed Aug. 9, 1952     2 Sheets-Sheet 1
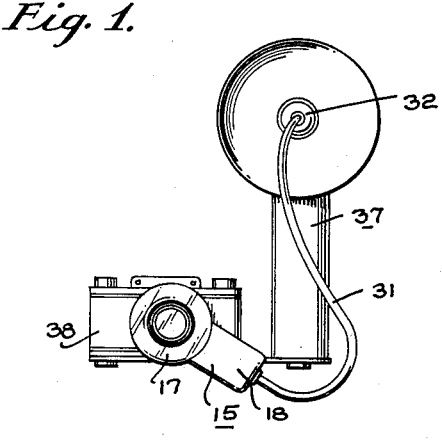
Fig. 1.
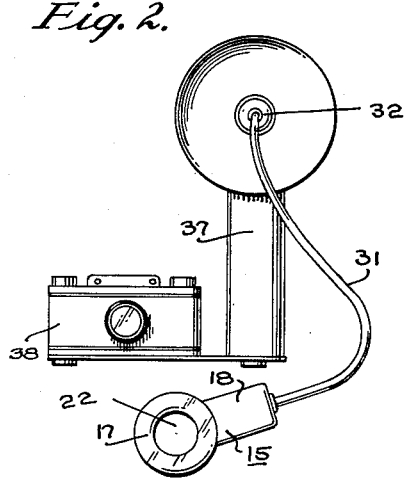
Fig. 2.
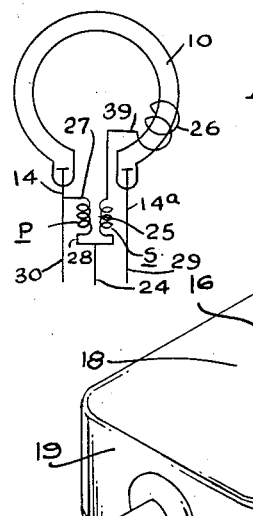
Fig. 9.
Fig. 3.
INVENTOR.
LESTER DINE
BY EDGAR S. LEMMEY
Attorney June 29, 1954 L. DINE ET AL 2,682,603
PORTABLE PHOTOGRAPHIC LIGHT UNIT
Filed Aug. 9, 1952 2 Sheets-Sheet 2
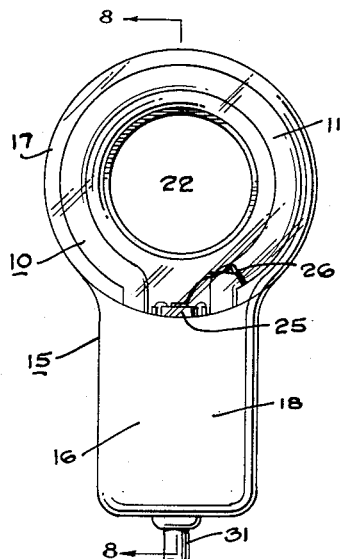
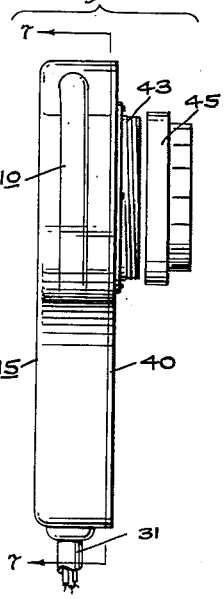
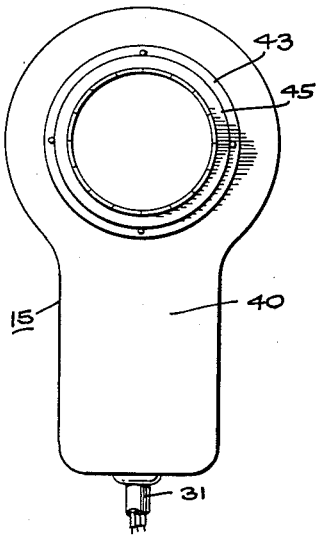
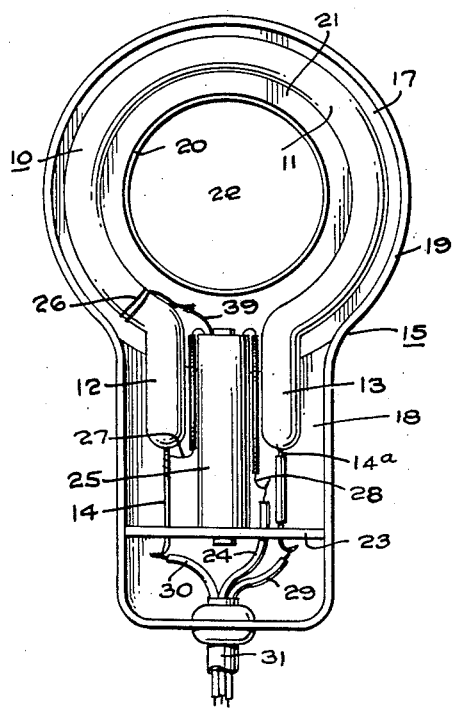
INVENTOR.
LESTER DINE
BY EDGAR S. LEMMEY
Attorney Patented June 29, 1954

2,682,603

UNITED STATES PATENT OFFICE 2,682,603

PORTABLE PHOTOGRAPHIC LIGHT UNIT

Lester Dine and Edgar S. Lemmey,
Levittown, N. Y.

Application August 9, 1952, Serial No. 303,544

3 Claims. (Cl. 240—1.3)

This invention relates to photographic light units and more particularly to an improved construction of a gaseous-discharge flash-lamp unit which is operative to produce the exposure flash for illuminating an object to be photographed and which is adapted to be operatively mounted directly upon the photographic camera.

Among the principal objects of the present invention is the provision of an exceedingly compact and light-weight lighting accessory for cameras which is characterized by the use of an electric discharge lamp in the form of a circular tube adapted for attachment in close relation to and concentrically about the camera lens to produce an intense flash of actinic light by which the subject to be photographed may be uniformly illuminated virtually free of any shadow.

A further object of the present invention is to provide a lighting unit of the character aforesaid which may be mounted directly upon the camera by use of a suitable adapter fitting or which may be held in the hand for special lighting effects, the unit being designed for use with any suitable flash gun through the simple expedient of wiring it with a plug which is adapted for insertion in the lamp socket of the flash gun in place of the conventional flash lamp.

Other objects and advantages of the present invention will be apparent more fully hereinafter, it being understood that the invention consists in the general combination, construction, location and relative arrangement of parts, all as described in detail in the following specification, as shown in the accompanying drawings and as finally pointed out in the appended claims.

In the accompanying drawings, which are illustrative of a preferred construction of the unit of the present invention:

Figure 1 is a front elevational view showing the lighting unit operatively mounted upon a camera fitted with a flash gun for energizing the unit.

Figure 2 is a view similar to Figure 1 but showing the lighting unit detached from the camera and ready to be held in the hand.

Figure 3 is a perspective view of the lighting unit per se.

Figure 4 is a front elevational view of the unit.

Figure 5 is a side elevational view thereof.

Figure 6 is a rear elevational view thereof.

Figure 7 is a view showing the interior of the unit as viewed from the line 7—7 of Figure 5;

Figure 8 is a sectional view of the unit as taken along the line 8—8 of Figure 4; and Figure 9 is a wiring diagram of the lighting unit.

Referring now to the drawings and more particularly to Figures 4 to 8 thereof, it will be observed that the lighting unit as constructed in accordance with and embodying the principles of the present invention essentially comprises a gaseous discharge tube 10 of glass or quartz within which is sealed a suitably ionizable gas, such as xenon, krypton or the like, the main body portion 11 of this tube being generally circular in form and having outwardly turned, substantially parallel portions 12 and 13 which constitute chambers which respectively enclose discharge supporting electrodes suitably connected to current leading-in wires 14 and 14a.

The gaseous discharge tube 10 is housed within an enclosure designated generally by the reference numeral 15, this enclosure being formed of any suitable transparent material, such as glass or clear plastic and being preferably molded or otherwise formed as shown to provide a substantially flat front facing 16 having a circularly shaped part 17 at one end and a rectangularly shaped part 18 at the other end thereof. The facing 16 is walled along its perimetral edge by a continuously extending flange 19 which fully encloses the sides and ends of the enclosure 15. The walled circular part 17 is centrally provided with an annular member 20 preferably formed as an integral component of the tube enclosure 15, this annular member 20 being so concentrically disposed within the circular part 17 as to form therewith an annular chamber 21 for receiving the circular body portion 11 of the tube. The annular chamber 21 freely communicates with the interior of the walled rectangular part 18 of the enclosure, thereby permitting the portions 12 and 13 of the tube to project freely into the part 18. Preferably, the central portion of the facing 16 of the circular part 17 of the enclosure 15 is left open, as shown at 22, so as to interpose no interference to the free passage of light rays therethrough and to the camera lens when the unit is mounted upon the camera, but, if desired, by forming the transparent facing 16 of the requisite optical design, it may be extended across the front end of the opening 22.

Suitably fixed in the rectangular part 18 of the tube enclosure is a supporting plate 23 of electrically insulating material, upon which are mounted the lead-in wires 14 and 14a to the tube electrodes and the lead-in conductor 24 to a spark coil 25 of conventional type having a secondary winding S suitably connected to a high-voltage spark trigger or trip wire electrode 26, the free end of which is wrapped around the tube 10 as shown.

It will be noted that only one end of the trip wire electrode 26 is connected to the spark coil secondary winding and that the trip wire electrode is itself capacity coupled to the electrode of the gaseous tube to complete the circuit for producing the requisite high-voltage triggering spark.

In accordance with conventional wiring of the electrical circuit for operation of the flash gun and energization of the gaseous tube 10, the primary winding P of the spark coil 25 is provided with terminal wires 27 and 28, of which the wire 27 is connected to the electrode 14 and the wire 28 to the spark coil lead-in conductor 24. The electrode lead-in wires 14ᵃ and 14 are respectively connected to conductors 29 and 30, which latter together with the spark coil lead-in conductor 24, are all included within a three-wire cable 31 of suitable length fitted at its end with a connector plug 32 having prongs 33, 34 and 35 to which the conductors are respectively connected. The plug may be provided with a fourth electrically disconnected prong 36 to facilitate proper insertion of the plug in the lamp socket of the flash gun unit 37 shown in Figures 1 and 2 carried by the camera 38.

It will be noted that the spark coil 25 is rigidly mounted in position upon the supporting plate 23 between the laterally spaced portions 12—13 of the gaseous tube and that the tube 10 is itself fixedly supported against displacement within the enclosure 15 by the relatively rigid terminal wire 39 of the trip wire electrode 26 and by the relatively inflexible electrode lead-in wires 14—14ᵃ which extend between the supporting plate and the terminal ends of the tube.

The open back of the enclosure 15 is fitted with a back plate 40 having a circular opening 41 formed therein in registry with the light transmitting opening 22. Preferably, the back plate 49 is permanently secured in place by adhesively or otherwise securing its perimetral edge to the correspondingly shaped edge of the wall-forming flange 19, thereby providing an hermetically sealed enclosure for the gaseous tube 10 and its operatively associated spark coil 25 and triggering electrode 26. In order to provide for only forward projection of light from the tube 10 upon effecting electric discharge of its gaseous atmosphere, all surfaces of the enclosure 15, excepting that circular portion of its front facing 16 which overlies the circular tube 10, are rendered opaque by the application thereto of a suitable coating 42 of paint or other material through which light may or may not be transmitted. Thus, the brilliant flash of light which it emitted by the tube is projected axially forward of the center of the tube and of the camera lens axis when the unit is mounted upon the camera as shown in Figure 1.

In order to conveniently mount the unit removably upon the camera with the discharge tube 10 concentrically disposed with reference to the camera lens, the back plate 40 of the tube enclosure 15 is fitted with an externally threaded annulus 43, suitably secured in position by rivets 44 or the like, upon which may be threaded a suitable adapter ring 45 for mounting the unit upon the lens mount of the camera, as will be readily understood. When the unit is thus mounted directly upon the camera and is energized through operation of the flash gun in synchronization with actuation of the camera shutter, a brilliant flash of actinic light, produced in full circle about the camera lens, is projected forwardly of the camera lens axis to provide shadow-free illumination of the subject to be photographed.

Due to its extremely light weight construction, the lighting unit of the present invention adds no appreciable weight to the camera upon which it is mounted and when desired it may be held conveniently in the hand to obtain such special lighting effects as may be desired or as the nature of the photographic subject may require. The rectanguuar extension of the unit, within which is housed the spark coil 25 and the electrode lead-in wires, is dimensioned to fit snugly in the hand and so provides a convenient handle for holding the unit in any desired position.

Inasmuch as all of the electrically charged parts of the units are hermetically seated within an enclosure made entirely of electrically nonconducting material, the user is fully protected against all possibility of electrical shock and the enclosed parts are themselves protected against corrosion and deterioration such as results from normal exposure to atmosphere.

It will be understood that the lighting unit of the present invention is susceptible of various changes and modifications which may be made from time to time without departing from the real spirit or general principles of the invention, and it is accordingly intended to claim the same broadly as well as specifically as indicated by the appended claims.

What is claimed as new and useful is:

1. In a portable photographic lighting unit of the character described adapted to be quick-detachably disposed in embracing relation about the lens of a camera or to be hand-held apart from the camera, a hollow casing formed entirely of electrically insulating material and including in one portion thereof an annular chamber having a light-transmitting frontal face and in another portion thereof a second chamber extending radially of said annular chamber, said annular chamber defining a central light transmitting opening through which light from a photographic subject may be reflected to the lens of a camera, the interior of said annular chamber being in communication with that of said second chamber, a tubular electric discharge flash lamp having a circular main body portion concentrically disposed within said annular chamber and electrode-supporting extensions projecting from said lamp into said second chamber, a spark coil also disposed in said second chamber between the electrode-supporting extensions of said tubular flash lamp, a high-voltage spark triggering electrode operatively connected electrically between said spark coil and said tubular flash lamp, and current conducting wires extending into said second chamber and respectively electrically connecting the terminal extremities of said lamp and its associated spark coil and triggering electrode to an external source of electrical energy.

2. In a portable photographic lighting unit of the character described adapted to be quick-detachably secured to the lens mount of a camera or to be hand-held apart from the camera, a hollow enclosure for a high-voltage gaseous discharge lamp capable of producing a brilliant flash of actinic light, said enclosure including a ring-shaped portion and a box-like portion extending radially from one side of said ring-shaped portion and disposed in the plane thereof, the interiors of said portions being hollow and in free communication with one another, a tubular gaseous discharge lamp of circular form disposed in said ring-shaped portion and having electrode-supporting elements projecting into said box-like portion, a spark coil electrically connected to said lamp and disposed also within said box-like portion of the enclosure, a high-voltage spark triggering electrode electrically connected between said spark coil and said lamp, means upon the rear of said ring-like portion of the enclosure for removably mounting the same upon the lens mount of a camera so as to dispose the ring-like portion and the circular lamp tube therein in coaxial registry with the camera lens, and current conducting wires connected to said lamp and its associated spark coil and triggering electrode and extending from said enclosure for connection to a source of electric energy remote from said enclosure.

3. In a portable photographic lighting unit of the character described adapted to be quick-demountably secured to the lens mount of a camera in concentric relation with the lens or to be hand-held apart from the camera, a hollow enclosure containing a tubular gaseous discharge lamp having a main body portion of circular form terminating in a pair of laterally spaced, substantially parallel electrode-supporting extensions coplanar with and extending outwardly from said circular portion of the lamp, said enclosure including a circular part embracing the circular portion of the lamp and a radially extending box-like part embracing the electrode-supporting extensions of the lamp, the circular part of said enclosure having an annular light-transmitting face which overlies the circular portion of the lamp and defines a central opening through which light emanating from the lamp to illuminate a photographic subject may be reflected from said subject to the lens of a camera, a high-voltage spark triggering means disposed within said enclosure and connected electrically to said lamp, current conducting wires extending into said enclosure electrically connecting said lamp and said spark triggering means to an external source of electrical energy, said conductor wires external of said enclosure being in the form of a multiple-conductor cable terminating in a connector plug, and means upon the rear of said enclosure for quick-removably mounting the unit upon the lens mount of a camera so as to dispose the circular portion of the tubular lamp in coaxial registry with the camera lens, the unit being so designed that upon demounting it from the camera it may be held in the hand as a source of illumination apart from the camera.

References Cited in the file of this patent

UNITED STATES PATENTS

| Number | Name | Date |
| --- | --- | --- |
| 1,901,100 | Hoffritz | Mar. 14, 1933 |
| 2,358,796 | Edgerton | Sept. 26, 1944 |
| 2,501,405 | Noel | Mar. 21, 1950 |
| 2,550,698 | King et al. | May 1, 1951 |
| 2,624,831 | Farber | Jan. 6, 1953 |
| 2,644,381 | Mendelsohn | July 7, 1953 |